United States Patent
Fu et al.

(10) Patent No.: US 9,793,810 B2
(45) Date of Patent: Oct. 17, 2017

(54) CONTROL METHOD FOR ZERO VOLTAGE SWITCHING BUCK-BOOST POWER CONVERTERS

(71) Applicant: Futurewei Technologies, Inc., Plano, TX (US)

(72) Inventors: Dianbo Fu, Plano, TX (US); Jinbo Huang, Guangzhou (CN); Ce Liu, Shenzhen (CN); Liming Ye, Frisco, TX (US); Heping Dai, Plano, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 45 days.

(21) Appl. No.: 14/850,125

(22) Filed: Sep. 10, 2015

(65) Prior Publication Data
US 2017/0077815 A1   Mar. 16, 2017

(51) Int. Cl.
*H02M 3/158* (2006.01)

(52) U.S. Cl.
CPC ................................. *H02M 3/1582* (2013.01)

(58) Field of Classification Search
CPC ...... H02M 3/155; H02M 3/156; H02M 3/158; H02M 3/1582; H02M 2003/1552; H02M 2003/156; H02M 2003/158
See application file for complete search history.

(56) References Cited

U.S. PATENT DOCUMENTS

| | | | | |
|---|---|---|---|---|
| 5,734,258 A | * | 3/1998 | Esser | H02M 3/1582 323/224 |
| 7,154,250 B2 | | 12/2006 | Vinciarelli | |
| 7,157,888 B2 | * | 1/2007 | Chen | H02M 3/157 323/224 |
| 7,652,453 B2 | * | 1/2010 | Iulian | H02M 3/156 323/259 |
| 8,723,487 B2 | | 5/2014 | Pahlevaninezhad et al. | |
| 2015/0171730 A1 | * | 6/2015 | Yin | H02M 3/157 323/272 |
| 2015/0280559 A1 | * | 10/2015 | Vaidya | H02M 3/1582 323/271 |

* cited by examiner

*Primary Examiner* — Matthew Nguyen
(74) *Attorney, Agent, or Firm* — Slater Matsil, LLP (57) ABSTRACT

A method comprises providing a buck-boost converter comprising a first high-side switch and a first low-side switch connected in series across an input capacitor, a second high-side switch and a second low-side switch connected in series across an output capacitor and an inductor coupled between a common node of the first high-side switch and the first low-side switch, and a common node of the second high-side switch and the second low-side switch, detecting a first voltage resonance waveform across a switch of the buck-boost converter and turning on the switch of the buck-boost converter when the first voltage resonance waveform falls to zero.

20 Claims, 7 Drawing Sheets

CONTROL METHOD FOR ZERO VOLTAGE SWITCHING BUCK-BOOST POWER CONVERTERS

TECHNICAL FIELD

The present invention relates to a power converter, and, in particular embodiments, to control mechanisms for buck-boost converters.

BACKGROUND

A power converter transforms an input voltage into a regulated output voltage and supplies a current required by an external load such as integrated circuits and the like. Depending on whether a transformer is incorporated into a power converter, switching power converters can be divided into two categories, namely isolated power converters and non-isolated power converters. Isolated power converters can be implemented by using different power topologies, such as flyback converters, forward converters, half bridge converters, full bridge converters, push-pull converters, inductor-inductor-capacitor (LLC) resonant converters and the like. Likewise, non-isolated power converters can be implemented by using different power topologies such as buck converters, boost converters, buck-boost converters, linear regulators, any combinations thereof.

As the demand for battery based power applications has grown recently, there has grown a need for developing a converter capable of generating a regulated output voltage from an input voltage, which may be larger than, equal to, or smaller than the output voltage. For example, in a battery based power application, when a battery is fresh, it may supply a voltage higher than the output voltage of the converter. On the other hand, when the battery is depleted, it may supply a voltage lower than the output voltage of the converter.

Buck-boost converters have emerged as an effective power conversion scheme to deliver a tightly regulated output voltage from a wide range input voltage. A buck-boost converter can produce an output voltage that is either greater than or less than an input voltage through using different operating modes such as buck and boost conversion modes. In particular, the buck-boost converter operates in a buck mode when the input voltage is higher than the output voltage, in a boost mode when the input voltage is lower than the output voltage.

SUMMARY OF THE INVENTION

These and other problems are generally solved or circumvented, and technical advantages are generally achieved, by preferred embodiments of the present invention which provide a method for achieving a high efficiency non-isolated power converter.

In accordance with an embodiment, a method comprises providing a buck-boost converter comprising a first high-side switch and a first low-side switch connected in series across an input capacitor, a second high-side switch and a second low-side switch connected in series across an output capacitor and an inductor coupled between a common node of the first high-side switch and the first low-side switch, and a common node of the second high-side switch and the second low-side switch.

The method further comprises detecting one or more voltage resonance waveforms across a switch of the buck-boost converter and turning on the switch of the buck-boost converter after the one or more voltage resonance waveforms fall to a voltage approximately equal to zero.

In accordance with yet another embodiment, an apparatus comprises a buck converter portion comprising a first high-side switch and a first low-side switch connected in series across an input capacitor, a boost converter portion comprising a second high-side switch and a second low-side switch connected in series across an output capacitor, an inductor coupled between the buck converter portion and the boost converter portion, wherein the buck converter portion, the boost converter portion and the inductor form a buck-boost converter.

The apparatus further comprises a controller configured to detect a first voltage resonance waveform across a switch of the buck-boost converter and turn on the switch of the buck-boost converter after the first voltage resonance waveform falls to zero.

An advantage of a preferred embodiment of the present invention is the efficiency of a buck-boost converter may be improved by zero voltage switching of the power switches of the buck-boost converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely control methods for a high efficiency buck-boost converter. Hereinafter, various embodiments will be explained in detail with reference to the accompanying drawings.

Figure 1:
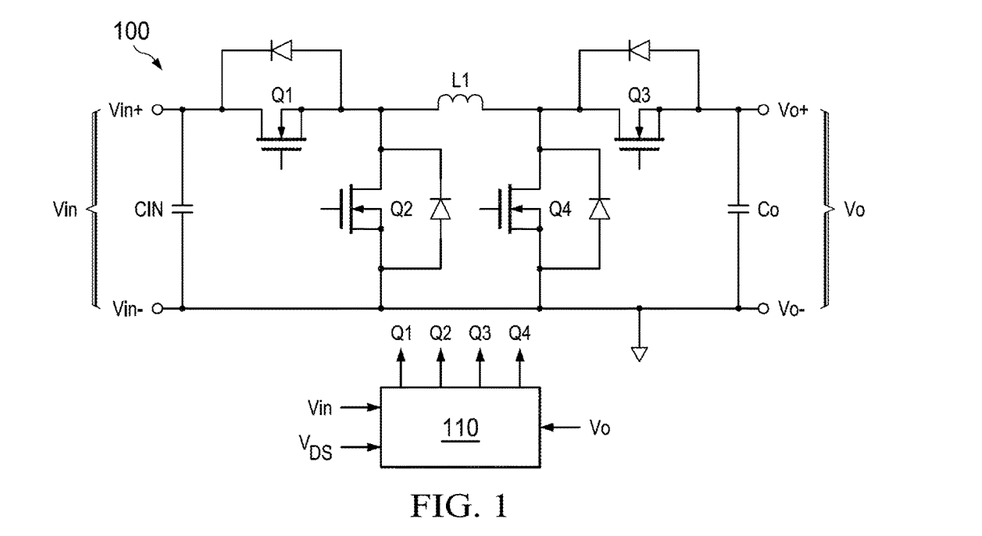
FIG. 1 illustrates a schematic diagram of a buck-boost converter in accordance with various embodiments of the present disclosure.

FIG. 1 illustrates a schematic diagram of a buck-boost converter in accordance with various embodiments of the present disclosure. The buck-boost converter 100 comprises a first high-side switch Q1, a first low-side switch Q2, a second high-side switch Q3, a second low-side switch Q4 and an inductor L1. The first high-side switch Q1 and the first low-side switch Q2 are connected in series between the positive terminal and the negative terminal of an input capacitor CIN. The second high-side switch Q3 and the second low-side switch Q4 are connected in series between the positive terminal and the negative terminal of an output capacitor Co. The inductor L1 is coupled between the common node of the first high-side switch Q1 and the first low-side switch Q2, and the common node of the second high-side switch Q3 and the second low-side switch Q4.

The buck-boost converter 100 may further comprise a controller 110. As shown in FIG. 1, the controller 110 may detect the input voltage Vin, the output voltage Vo, the drain-to-source voltages $V_{DS}$ of Q1-Q4, and generate a plurality of gate drive signals for driving switches Q1, Q2, Q3 and Q4 accordingly. The controller 110 may be a PWM controller. Alternatively, the controller 110 may be implemented as a digital controller such as a micro-controller, a digital signal processor and/or the like.

It should be noted that while the example throughout the description is based upon a buck-boost converter and a controller configured to generate gate drive signal for the buck-boost converter (e.g., buck-boost converter shown in FIG. 1), the buck-boost converter 100 as well as the controller 110 shown in FIG. 1 may have many variations, alternatives, and modifications. For example, the controller 110 may detect other necessary signals such as the input and/or output current of the buck-boost converter 100. Furthermore, there may be one dedicated driver or multiple dedicated drivers coupled between the controller 110 and the switches Q1, Q2, Q3 and Q4.

In sum, the buck-boost converter 100 and the controller 110 illustrated herein is limited solely for the purpose of clearly illustrating the inventive aspects of the various embodiments. The present invention is not limited to any particular power topology.

The buck-boost converter 100 may be divided into two portions, namely a buck converter portion and a boost converter portion. The buck converter portion may comprise the first high-side switch Q1 and the first low-side switch Q2. The buck converter portion and the inductor L1 may function as a step-down converter. On the other hand, the boost converter portion may comprise the second high-side switch Q3 and second low-side switch Q4. The boost converter portion and the inductor L1 may function as a step-up converter. The buck converter portion, the inductor L1 and the boost converter portion are connected in cascade between the input capacitor CIN and the output capacitor Co.

The switches (e.g., switches Q1-Q4) shown in FIG. 1 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should further be noted that while FIG. 1 illustrates four switches Q1, Q2, Q3, and Q4, various embodiments of the present disclosure may include other variations, modifications and alternatives. For example, the low-side switch Q2 may be replaced by a freewheeling diode and/or the like. The high-side switch Q3 may be replaced by a rectifier diode and/or the like.

Based upon different design needs, three control mechanisms may be employed to operate the buck-boost converter 100. In a first control mechanism, a switch is turned on after the controller 110 detects a voltage resonance waveform across the switch. More particularly, the switch is turned on when the voltage resonance waveform across the switch falls to zero.

In a second control mechanism, a switch is turned on after the controller 110 detects a plurality of voltage resonance waveforms across the switch. More particularly, the switch is turned on when a last voltage resonance waveform of the plurality of voltage resonance waveforms across the switch falls to zero.

In a third control mechanism, a switch is turned on after the controller 110 detects a negative current flowing through the inductor L1. More particular, the switch is turned on when the negative current reaches its peak value. In some embodiments, the peak value of the negative current is approximately equal to the peak of the positive current flowing through the inductor L1.

The three control mechanisms described above are based upon discontinuous conduction mode (DCM)/continuous conduction mode (CCM) boundary current mode (BCM) control. The BCM control technique may help the buck-boost converter 100 achieve zero voltage switching (ZVS) in different operating modes (e.g., buck operating modes, boost operating modes and buck-boost operating modes). The ZVS operation of the buck-boost converter 100 may reduce the switching losses and improve the efficiency of the buck-boost converter 100.

Figure 2:
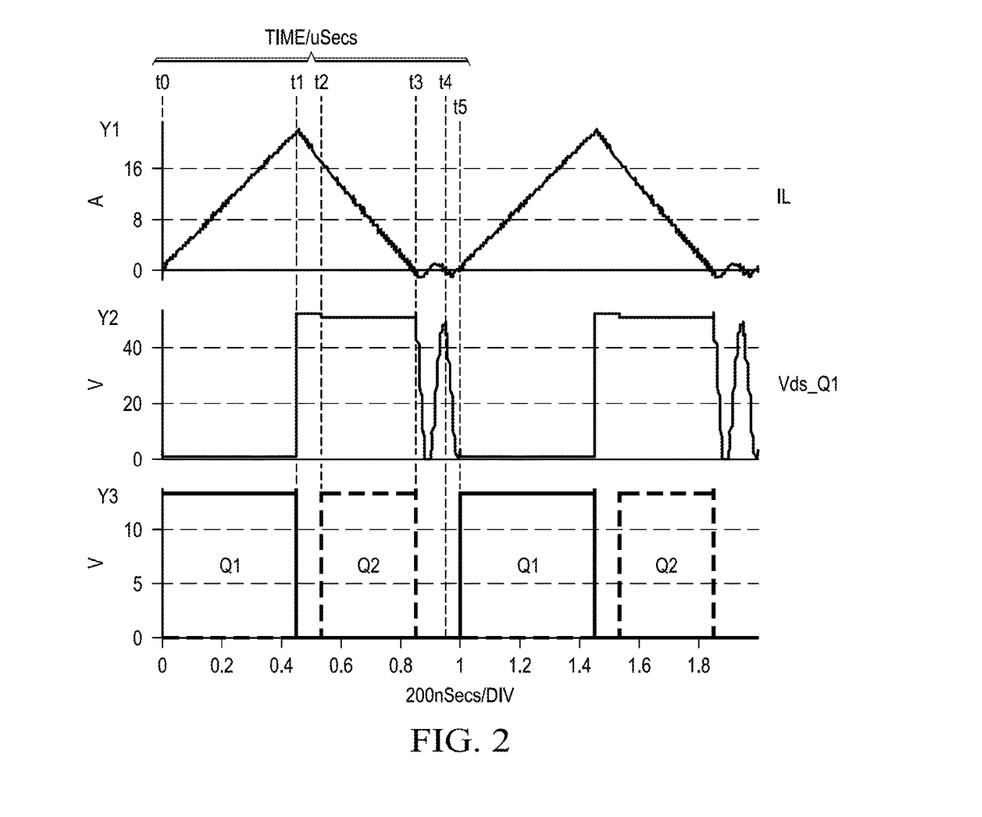
FIG. 2 illustrates timing diagrams associated with a buck operating mode under the first control mechanism in accordance with various embodiments of the present disclosure.

FIG. 2 illustrates timing diagrams associated with a buck operating mode under the first control mechanism in accordance with various embodiments of the present disclosure. The horizontal axis of FIG. 2 represents intervals of time. There are three vertical axes. The first vertical axis Y1 represents the current flowing through the inductor L1 of the buck-boost converter 100. The second vertical axis Y2 represents the drain-to-source voltage of Q1. The third vertical axis Y3 represents the gate drive signals of switches Q1 and Q2.

The buck-boost converter 100 operates in a buck operating mode. During the buck operating mode, Q3 is always on and Q4 is always off. Q1 and Q2 are driven by PWM signals. The output voltage of the buck-boost converter 100 is controlled by modulating the duty cycle of Q1.

At t0, when Q1 is turned on, the current flowing through the inductor L1 ramps up. The voltage across Q1 is equal to the current flowing through the inductor L1 times the on-resistance of Q1. At t1, when Q1 is turned off, the current flowing through the inductor L1 reaches its peak as shown in FIG. 2 and starts to decrease at t1. At t1, the voltage across Q1 jumps to a higher voltage level. In some embodiments, the voltage across Q1 is approximately equal to the input voltage Vin. There may be a dead time between the turn-off of Q1 and the turn-on of Q2. As shown in FIG. 2, the dead time is from t1 to t2. During the dead time, Q2 remains off until t2. At t2, Q2 is turned on and remains on until t3.

At t3, both Q1 and Q2 are turned off. Prior to the turn-on of Q1 at t5, a resonant process occurs from t3 to t5. Such a resonant process forms a voltage resonance waveform across Q1 from t3 to t5.

As shown in FIG. 2, at t3, and the current flowing through the inductor L1 starts to cross the zero line. Since both Q1 and Q2 are turned off, this current has to charge Q2's drain-to-source capacitance and supply a current to Vin through the body diode of Q1. The drain-to-source capacitance of Q2 resonates with the inductor L1 and generates the voltage resonance waveform across Q1. In particular, from t3 to t4, the voltage across Q1 ramps up quickly and reaches its peak at t4. From t4 to t5, the voltage across Q1 drops back to a voltage approximately equal to zero at t5.

As shown in FIG. 2, at t5, the voltage across Q1 is approximately equal to zero. The buck-boost converter 100 detects this zero voltage crossing and turns on Q1 accordingly at t5. After Q1 is turned on, the voltage across Q1 is equal to the current flowing through Q1 times the on-resistance of Q1.

One advantageous feature of the control mechanism shown in FIG. 2 is the buck-boost converter 100 is able to detect a zero voltage crossing after a voltage resonant process and turn on Q1 accordingly. Such a ZVS transition process of Q1 helps to reduce switching losses of Q1.

Figure 3:
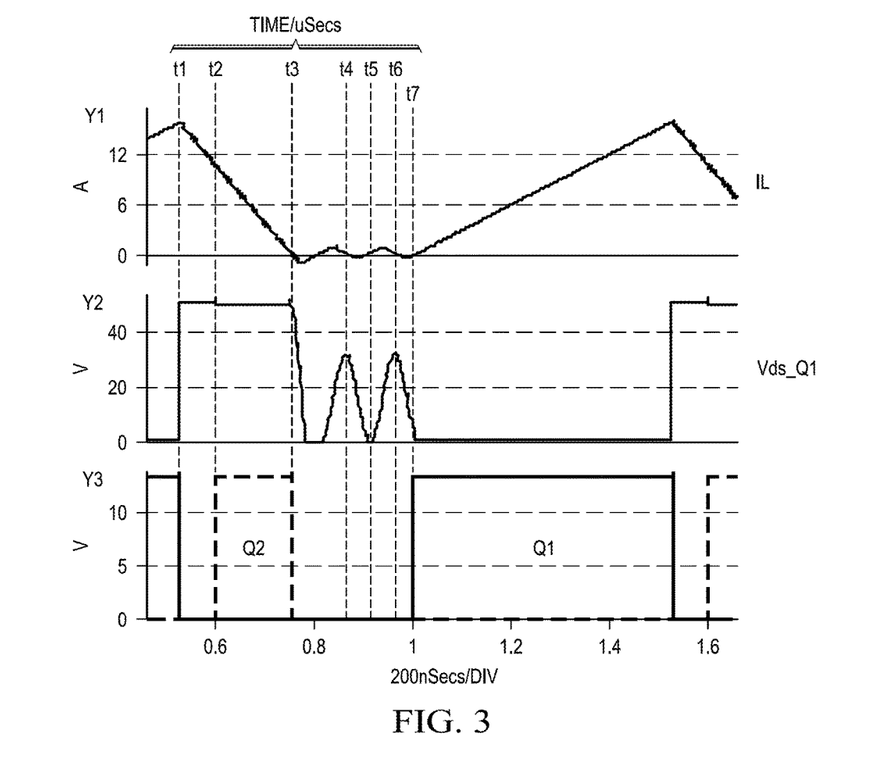
FIG. 3 illustrates timing diagrams associated with a buck operating mode under the second control mechanism in accordance with various embodiments of the present disclosure.

FIG. 3 illustrates timing diagrams associated with a buck operating mode under the second control mechanism in accordance with various embodiments of the present disclosure. The horizontal axis of FIG. 3 represents intervals of time. There are three vertical axes. The first vertical axis Y1 represents the current flowing through the inductor L1 of the buck-boost converter 100. The second vertical axis Y2 represents the drain-to-source voltage of Q1. The third vertical axis Y3 represents the gate drive signals of switches Q1 and Q2.

The ZVS process shown in FIG. 3 is similar to that shown in FIG. 2 except that there are many resonance waveforms across Q1 between the turn-off of Q2 and the turn-on of Q. There may be a plurality of voltage resonance waveforms across Q1 from t3 to t7. Q1 is turned on after a last voltage resonance waveform of the plurality of voltage resonance waveforms falls to zero.

As shown in FIG. 3, there may be two voltage resonance waveforms between t3 and t7. A first voltage resonance waveform starts from t3, reaches its peak at t4 and finishes at t5. The second voltage resonance waveform starts from t5, reaches its peak at t6 and finishes at t7. At t7, the voltage across Q1 is approximately equal to zero. The buck-boost converter 100 detects this zero voltage crossing and turns on Q1 accordingly at t7.

It should be noted that the number of voltage resonance waveforms shown in FIG. 3 is selected purely for demonstration purposes and are not intended to limit the various embodiments of the present disclosure to any particular number of voltage resonance waveforms between the turn-off of Q2 and the turn-on of Q1.

One advantageous feature of having the control mechanism shown in FIG. 3 is that the switching frequency of the buck-boost converter 100 may be controlled by selecting the number of voltage resonance waveforms between t3 and t7. More particularly, in order to achieve ZVS, the buck-boost converter 100 may operate in a DCM-CCM boundary mode. During the DCM-CCM boundary mode, the switching frequency of the buck-boost converter 100 is not fixed. For some applications such as telecommunications and/or the like, a fixed frequency power supply is a must-have feature. The control mechanism shown in FIG. 3 is able to control the switching period of the buck-boost converter 100 by selecting the number of voltage resonance waveforms between t3 and t7.

Another advantageous feature of the control mechanism shown in FIG. 3 is that the efficiency of the buck-boost converter 100 may be further improved by decreasing the switching frequency of the buck-boost converter 100 when it operates in a light load mode, wherein the light load of the buck-boost converter 100 is 10% or less of the full load of the buck-boost converter 100. During the light load mode, the turn-on of Q1 may be further delayed by adding more voltage resonance waveforms between t3 and t7. As a result, the switching frequency of the buck-boost converter 100 is reduced accordingly. Such a reduced switching frequency helps to further improve the efficiency of the buck-boost converter 100. Furthermore, the control mechanism shown in FIG. 3 also helps to limit the maximum switching frequency of the buck-boost converter 100 during the light load mode.

Figure 4:
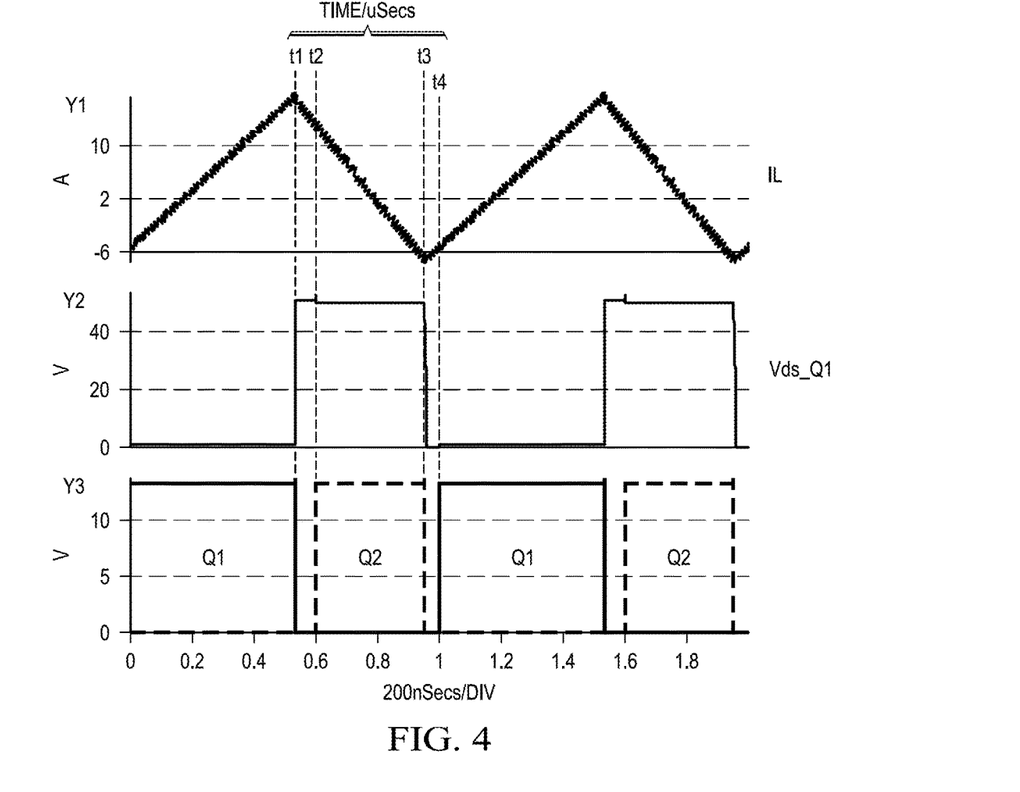
FIG. 4 illustrates timing diagrams associated with a buck operating mode under the third control mechanism in accordance with various embodiments of the present disclosure.

FIG. 4 illustrates timing diagrams associated with a buck operating mode under the third control mechanism in accordance with various embodiments of the present disclosure. The horizontal axis of FIG. 4 represents intervals of time. There are three vertical axes. The first vertical axis Y1 represents the current flowing through the inductor L1 of the buck-boost converter 100. The second vertical axis Y2 represents the drain-to-source voltage of Q1. The third vertical axis Y3 represents the gate drive signals of switches Q1 and Q2.

The ZVS process shown in FIG. 4 is similar to that shown in FIG. 2 except that Q1 is turned on after the body diode of Q1 conducts. As shown in FIG. 4, the inductor current has a negative value after Q2 is turned off at t3. Since Q2 is turned off, the negative inductor current flows through the body diode of Q1. As a result, the voltage across Q1 is approximately equal to the body diode voltage drop, which is approximately equal to 0.7 V. The buck-boost converter 100 detects this low voltage (e.g., 0.7 V) and turns on Q1 accordingly at t4.

Figure 5:
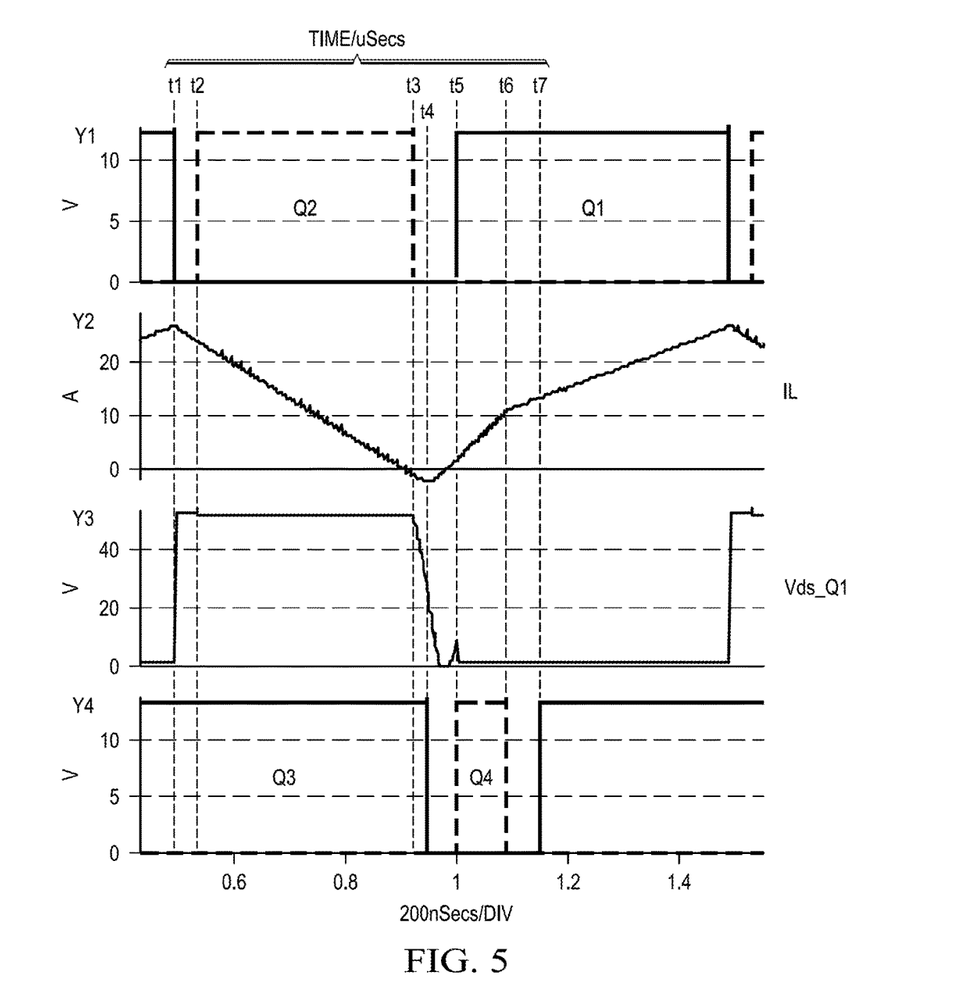
FIG. 5 illustrates timing diagrams associated with a buck-boost operating mode under the first control mechanism in accordance with various embodiments of the present disclosure.

FIG. 5 illustrates timing diagrams associated with a buck-boost operating mode under the first control mechanism in accordance with various embodiments of the present disclosure. The horizontal axis of FIG. 5 represents intervals of time. There are four vertical axes. The first vertical axis Y1 represents the gate drive signals of switches Q1 and Q2. The second vertical axis Y2 represents the current flowing through the inductor L1 of the buck-boost converter 100.

The third vertical axis Y3 represents the drain-to-source voltage of Q1. The fourth vertical axis Y4 represents the gate drive signals of switches Q3 and Q4.

The buck-boost converter 100 operates in a buck-boost operating mode. Q1, Q2, Q3 and Q4 are driven by PWM signals. As shown in FIG. 5, the turn-on time of Q4 is aligned with the turn-on time of Q1. It should be noted that the PWM control mechanism shown in FIG. 5 is merely an example. A person skilled in the art will recognize there may be many variations, alternatives and modifications.

The zero voltage switching in FIG. 5 is similar to that shown in FIG. 2. After Q2 is turned off at t3, the current flowing through the inductor L1 starts to cross the zero line. Such an inductor current generates a voltage resonant process between the inductor and the parasitic capacitance of Q2. The buck-boost converter 100 detects the zero crossing of the drain-to-source voltage of Q1 and turns on Q1 accordingly. It should be noted that Q4 also achieves ZVS when Q4 is turned on at t5.

Figure 6:
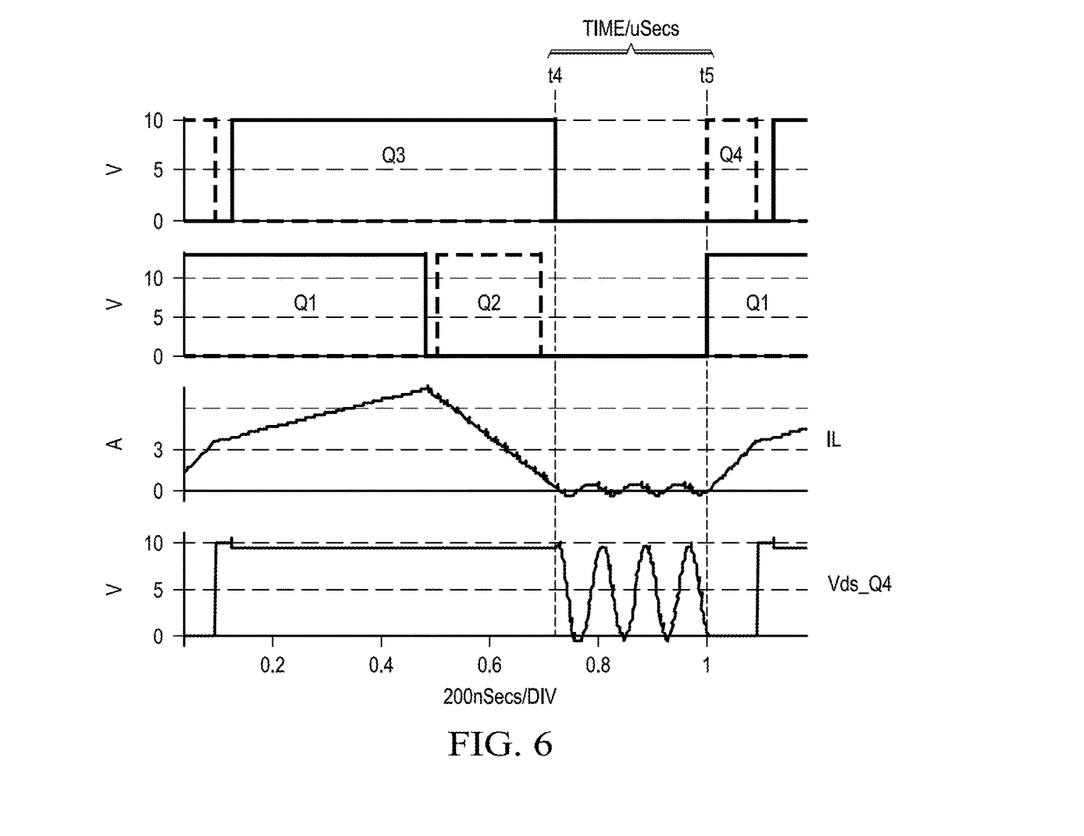
FIG. 6 illustrates timing diagrams associated with a buck-boost operating mode under the second control mechanism in accordance with various embodiments of the present disclosure.

FIG. 6 illustrates timing diagrams associated with a buck-boost operating mode under the second control mechanism in accordance with various embodiments of the present disclosure. The horizontal axis of FIG. 6 represents intervals of time. There are four vertical axes. The first vertical axis Y1 represents the gate drive signals of switches Q3 and Q4. The second vertical axis Y2 represents the gate drive signals of switches Q1 and Q2. The third vertical axis Y3 represents the current flowing through the inductor L1 of the buck-boost converter 100. The fourth vertical axis Y4 represents the drain-to-source voltage of Q4.

In some embodiments, the buck-boost converter 100 operates in a light load mode. Q4 is turned on after a plurality of voltage resonance processes occur. As shown in FIG. 6, there may be three voltage resonance waveforms between t4 and t5. At t5, the voltage across Q4 is approximately equal to zero. The buck-boost converter 100 detects this zero voltage crossing and turns on Q4 accordingly at t5. It should be noted Q1 also achieves ZVS at t5.

It should be noted that the number of voltage resonance waveforms between t4 and t5 shown in FIG. 6 is selected purely for demonstration purposes and are not intended to limit the various embodiments of the present disclosure to any particular number of voltage resonance waveforms.

Figure 7:
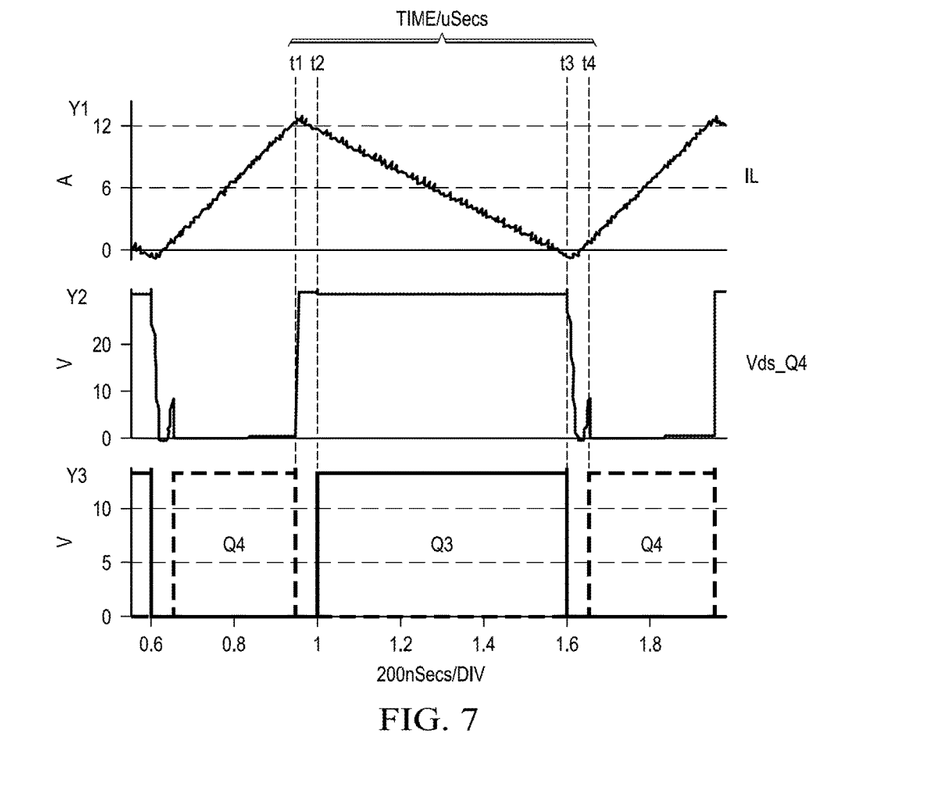
FIG. 7 illustrates timing diagrams associated with a boost operating mode under the first control mechanism in accordance with various embodiments of the present disclosure.

FIG. 7 illustrates timing diagrams associated with a boost operating mode under the first control mechanism in accordance with various embodiments of the present disclosure. The horizontal axis of FIG. 7 represents intervals of time. There are three vertical axes. The first vertical axis Y1 represents the current flowing through the inductor L1 of the buck-boost converter 100. The second vertical axis Y2 represents the drain-to-source voltage of Q4. The third vertical axis Y3 represents the gate drive signals of switches Q3 and Q4.

The zero voltage switching in FIG. 7 is similar to that shown in FIG. 2. After Q3 is turned off at t3, the current flowing through the inductor starts to cross the zero line. Such an inductor current generates a voltage resonant process between the inductor L1 and the parasitic capacitance of Q4. The buck-boost converter 100 detects the zero crossing of the drain-to-source voltage of Q4 and turns on Q4 accordingly.

Figure 8:
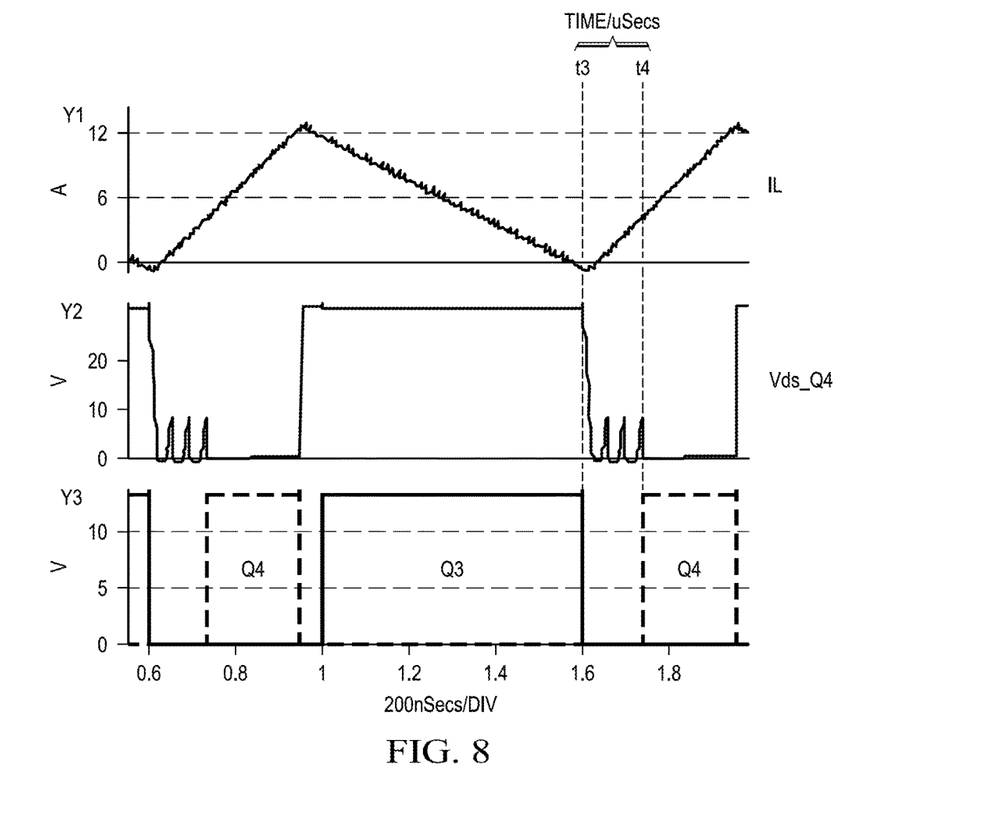
FIG. 8 illustrates timing diagrams associated with a boost operating mode under the second control mechanism in accordance with various embodiments of the present disclosure.

FIG. 8 illustrates timing diagrams associated with a boost operating mode under the second control mechanism in accordance with various embodiments of the present disclosure. The horizontal axis of FIG. 8 represents intervals of time. There are three vertical axes. The first vertical axis Y1 represents the current flowing through the inductor L1 of the buck-boost converter 100. The second vertical axis Y2 represents the drain-to-source voltage of Q4. The third vertical axis Y3 represents the gate drive signals of switches Q3 and Q4.

The ZVS process shown in FIG. 8 is similar to that shown in FIG. 7 except that Q4 is turned on after a plurality of resonance processes occur between t3 and t4. As shown in FIG. 8, there may be three voltage resonance processes between t3 and t4. At t4, the voltage across Q4 is approximately equal to zero. The buck-boost converter 100 detects this zero voltage crossing and turns on Q4 accordingly at t4.

It should be noted that the number of voltage resonance waveforms between t3 and t4 shown in FIG. 8 is selected purely for demonstration purposes and are not intended to limit the various embodiments of the present disclosure to any particular number of voltage resonance waveforms.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    detecting one or more voltage resonance waveforms across a switch of a buck-boost converter, wherein the buck-boost converter comprises a first high-side switch and a first low-side switch connected in series across an input capacitor, a second high-side switch and a second low-side switch connected in series across an output capacitor and an inductor coupled between a common node of the first high-side switch and the first low-side switch, and a common node of the second high-side switch and the second low-side switch; and
    turning on the switch of the buck-boost converter after the one or more voltage resonance waveforms fall to a voltage approximately equal to zero, wherein, prior to turning on the switch, a voltage across the switch falls to a first voltage approximately equal to zero and increases from the first voltage to a second voltage greater than zero.

2. The method of claim 1, wherein:
    the inductor resonates with a drain-to-source capacitor to generate the one or more voltage resonance waveforms.

3. The method of claim 1, wherein:
    turning on the switch of the buck-boost converter after the one or more voltage resonance waveforms fall to a voltage approximately equal to zero includes turning on the switch of the buck-boost converter after a first voltage resonance waveform falls to zero.

4. The method of claim 1, wherein:
    turning on the switch of the buck-boost converter after the one or more voltage resonance waveforms fall to a voltage approximately equal to zero includes turning on the switch of the buck-boost converter when a last voltage resonance waveform of the one or more voltage resonance waveforms falls to zero.

5. The method of claim 4, further comprising:
configuring the buck-boost converter to operate at a fixed switching frequency by selecting a number of the voltage resonance waveforms between a first voltage resonance waveform and a turn-on time of the switch of the buck-boost converter.

6. The method of claim 4, further comprising:
under a light load operating condition, limiting a maximum switching frequency of the buck-boost converter by selecting a number of the voltage resonance waveforms between a first voltage resonance waveform and a turn-on time of the switch of the buck-boost converter.

7. The method of claim 1, wherein:
during a buck operating mode, the switch is the first high-side switch.

8. The method of claim 1, wherein:
during a boost operating mode, the switch is the second low-side switch.

9. The method of claim 1, further comprising:
configuring the buck-boost converter to operate in a buck operating mode, wherein the switch is the first high-side switch.

10. The method of claim 1, further comprising:
configuring the buck-boost converter to operate in a boost operating mode, wherein the switch is the second low-side switch.

11. An apparatus comprising:
a buck converter portion comprising a first high-side switch and a first low-side switch connected in series across an input capacitor;
a boost converter portion comprising a second high-side switch and a second low-side switch connected in series across an output capacitor;
an inductor coupled between the buck converter portion and the boost converter portion, wherein the buck converter portion, the boost converter portion and the inductor form a buck-boost converter; and
a controller configured to:
detect a first voltage resonance waveform across a switch of the buck-boost converter, wherein the first voltage resonance waveform includes a peak and two valleys; and
turn on the switch of the buck-boost converter after the first voltage resonance waveform falls to zero.

12. The apparatus of claim 11, wherein the controller is configured to:
operate the buck-boost converter in a buck operating mode and turn on the first high-side switch of the buck-boost converter when a first voltage resonance waveform across the first high-side switch falls to a voltage approximately equal to zero.

13. The apparatus of claim 11, wherein the controller is configured to:
operate the buck-boost converter in a boost operating mode and turn on the second low-side switch of the buck-boost converter when a first voltage resonance waveform across the second low-side switch falls to a voltage approximately equal to zero.

14. The apparatus of claim 11, wherein the controller is configured to:
operate the buck-boost converter in a buck operating mode and turn on the first high-side switch of the buck-boost converter when a last resonance waveform of a plurality of voltage resonance waveforms across the first high-side switch falls to a voltage approximately equal to zero.

15. The apparatus of claim 11, wherein the controller is configured to:
operate the buck-boost converter in a boost operating mode and turn on the second low-side switch of the buck-boost converter when a last resonance waveform of a plurality of voltage resonance waveforms across the second low-side switch falls to a voltage approximately equal to zero.

16. The apparatus of claim 11, wherein the controller is configured to:
detect the first voltage resonance waveform across the switch of the buck-boost converter, and wherein the first voltage resonance waveform is generated by a resonance process between the inductor and a drain-to-source capacitor of the switch.

17. The apparatus of claim 11, wherein the controller is configured to:
operate the buck-boost converter in a fixed switching frequency mode by selecting a number of voltage resonance waveforms between the first voltage resonance waveform and a turn-on time of the switch of the buck-boost converter.

18. The apparatus of claim 17, wherein:
at least one voltage resonance waveform is between the first voltage resonance waveform and the turn-on time of the switch of the buck-boost converter.

19. The apparatus of claim 11, wherein the controller is configured to:
under a light load operating condition, limit a maximum switching frequency of the buck-boost converter by selecting a number of voltage resonance waveforms between the first voltage resonance waveform and a turn-on time of the switch of the buck-boost converter.

20. The apparatus of claim 19, wherein:
at least one voltage resonance waveform is between the first voltage resonance waveform and the turn-on time of the switch of the buck-boost converter.

* * * * *